United States Patent
Johnson et al.

(10) Patent No.: US 9,535,586 B2
(45) Date of Patent: Jan. 3, 2017

(54) GEO-FENCE CREATION ON TOUCH-ENABLED DEVICES

(71) Applicant: Intel Corporation, Santa Clara, CA (US)

(72) Inventors: Derick Arnold Johnson, Folsom, CA (US); Thomas A. Birch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/123,373

(22) PCT Filed: Jun. 26, 2013

(86) PCT No.: PCT/US2013/047951
§ 371 (c)(1),
(2) Date: Dec. 2, 2013

(87) PCT Pub. No.: WO2014/130072
PCT Pub. Date: Aug. 28, 2014

(65) Prior Publication Data
US 2015/0346968 A1    Dec. 3, 2015

Related U.S. Application Data

(60) Provisional application No. 61/768,252, filed on Feb. 22, 2013.

(51) Int. Cl.
*G06F 3/048* (2013.01)
*G06F 3/0484* (2013.01)
(Continued)

(52) U.S. Cl.
CPC .......... *G06F 3/04845* (2013.01); *G01C 21/00* (2013.01); *G06F 3/0482* (2013.01); *G06F 3/0488* (2013.01);
(Continued)

(58) Field of Classification Search
CPC ..................................................... C06F 3/0481
(Continued)

(56) References Cited

U.S. PATENT DOCUMENTS 8,019,532 B2 *  9/2011  Sheha ............... G01C 21/20
                                             340/995.1
2005/0159883 A1 *  7/2005  Humphries ........... B60R 25/00
                                             701/517
(Continued)

FOREIGN PATENT DOCUMENTS

KR    1020100052324 A    5/2010
WO    WO-2011057273 A1    5/2011
WO    WO-2014130072 A1    8/2014

OTHER PUBLICATIONS

Available at https://www.etracllc.com/etrac/uploads/Geo%20Fence%20Setup%20Instructions.pdf, Apr. 22, 2009.*
(Continued)

*Primary Examiner* — Matthew Ell
(74) *Attorney, Agent, or Firm* — Schwegman Lundberg Woessner, P.A.

(57) ABSTRACT

Various systems and methods for creating geo-fences on touch-enabled devices are described herein. In an example, a map is displayed on a touch screen interface of a mobile device. User input is received from the touch screen interface, the user input resulting from a user touching the touch screen interface. An enclosed area is derived using the user input and the enclosed area is presented as a geo-fence object on the touch screen interface.

22 Claims, 10 Drawing Sheets

(51) Int. Cl.

| | | |
|---|---|---|
| *G06F 3/0488* | (2013.01) | |
| *G06F 17/30* | (2006.01) | |
| *G06F 3/0482* | (2013.01) | |
| *G06F 3/14* | (2006.01) | |
| *G06F 9/44* | (2006.01) | |
| *G01C 21/00* | (2006.01) | |
| *G06Q 10/00* | (2012.01) | |
| *G08G 1/00* | (2006.01) | |
| *H04M 1/725* | (2006.01) | |
| *H04W 4/02* | (2009.01) | |

(52) U.S. Cl.
CPC ....... *G06F 3/04842* (2013.01); *G06F 3/04847* (2013.01); *G06F 3/04883* (2013.01); *G06F 3/14* (2013.01); *G06F 9/44* (2013.01); *G06F 17/30241* (2013.01); *G06Q 10/00* (2013.01); *G08G 1/207* (2013.01); *H04M 1/72522* (2013.01); *H04M 2250/22* (2013.01); *H04W 4/021* (2013.01)

(58) Field of Classification Search
USPC ........................................................ 715/771
See application file for complete search history.

(56) References Cited

U.S. PATENT DOCUMENTS

| | | |
|---|---|---|
| 2006/0200305 A1 | 9/2006 | Sheha et al. |
| 2008/0183485 A1 | 7/2008 | Drabble et al. |
| 2009/0144375 A1* | 6/2009 | Maltempo .............. H04L 51/38 709/206 |
| 2010/0042940 A1 | 2/2010 | Monday et al. |
| 2010/0171712 A1* | 7/2010 | Cieplinski ........... G06F 3/04883 345/173 |
| 2010/0312599 A1 | 12/2010 | Durst |
| 2011/0112768 A1* | 5/2011 | Doyle .................... G06Q 10/08 701/300 |
| 2011/0306304 A1* | 12/2011 | Forutanpour ....... G06F 3/04883 455/67.11 |
| 2012/0008526 A1 | 1/2012 | Borghei |
| 2012/0309413 A1 | 12/2012 | Grosman et al. |
| 2013/0006522 A1 | 1/2013 | Vellaikal et al. |

OTHER PUBLICATIONS

"International Application Serial No. PCT/US2013/047951, International Search Report mailed Nov. 22, 2013", 3 pgs.

"International Application Serial No. PCT/US2013/047951, Written Opinion mailed Nov. 22, 2013", 6 pgs.

"International Application Serial No. PCT/US2013/047951, International Preliminary Report on Patentability mailed Sep. 3, 2015", 8 pgs.

"European Application Serial No. 13875658.0, Extended European Search Report mailed Oct. 5, 2016", 7 pgs.

\* cited by examiner

GEO-FENCE CREATION ON TOUCH-ENABLED DEVICES

CLAIM OF PRIORITY

This patent application is a U.S. National Stage Filing under 35 U.S.C. 371 from International Application No. PCT/US2013/047951, filed Jun. 26, 2013, which claims the benefit of U.S. Provisional Patent Application Ser. No. 61/768,252, titled "GEO-FENCE CREATION ON TOUCH-ENABLED DEVICES," filed Feb. 22, 2013, which applications are hereby incorporated by reference in their entirety.

TECHNICAL FIELD

Embodiments described herein generally relate to geo-fence technology and in particular, geo-fence creation on touch-enabled devices.

BACKGROUND

The widespread availability of multi-functional mobile devices has resulted in having these devices as an integral medium for everyday activities. Mobile devices are capable of displaying maps, using position sensing technologies (e.g., global positioning system (GPS)), and providing alerts via text, graphics, audio, and the like.

A geo-fence is a virtual boundary around a geographic location. When a location-aware mobile device enters or exits a geo-fenced area, various actions may occur, such as presenting a notification on the mobile device. Geo-fences are used in a variety of applications, including security, insurance, and recreation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

As people increasingly rely on mobile devices in their day-to-day lives, creating and managing location-based applications from a mobile situation is correspondingly becoming more important. One useful technology for location-based applications is geo-fencing. Geo-fencing includes creating and managing a geo-fence, which is a virtual boundary of a geographical area. A geo-fence may be considered an object (e.g., a geo-fence object), such that the geo-fence may have various properties like objects in other disciplines, such as object-oriented programming. In this way, a geo-fence object may include attributes and functions.

Attributes may include data, such as a name, unique identifier, coordinates defining the geo-fence (e.g., a latitude/longitude or a relative coordinate system), an active and expiration date/time, permissions, and the like.

Functions may include actions such as notifications on entry/exit of a geo-fence, application download or initiation upon entry/exit, or other actions that occur on a user's mobile device or are caused to occur on another device associated with the user or on another user's device.

For example, a geo-fence may have attributes such as a name, "Memorial Day Sale" and a location, e.g., situated to enclose a store location at a mall. The geo-fence may have a beginning date of midnight, May 25, 2013 and an expiration date of midnight, May 28, 2013. The "Memorial Day Sale" geo-fence may have functions associated with it such that when a user enters the geo-fence a coupon notification is pushed to the user's device. The coupon notification may include a mechanism that allows the user to navigate to a web page (e.g., embedded web link), which displays a coupon for the Memorial Day Sale at the store.

In order to take advantage of these types of location-based functions, one or more geo-fences have to first be created. While creating geo-fences on large form factor device, such as a desktop computer is generally easier because it allows the user to precisely plot the vertices of a geo-fence using a mouse, the move towards smaller, touch enabled devices, creates a need for an effective way to create digital boundaries on these smaller form factors.

Geo-fencing is still a relatively new field and there are currently no applications that allow one to create precise geo-fences directly on a mobile device. The implementations disclosed herein make it much easier to create geo-fences on small form-factor or touch-enabled devices rather than use the same methods used on larger devices.

Figure 1:
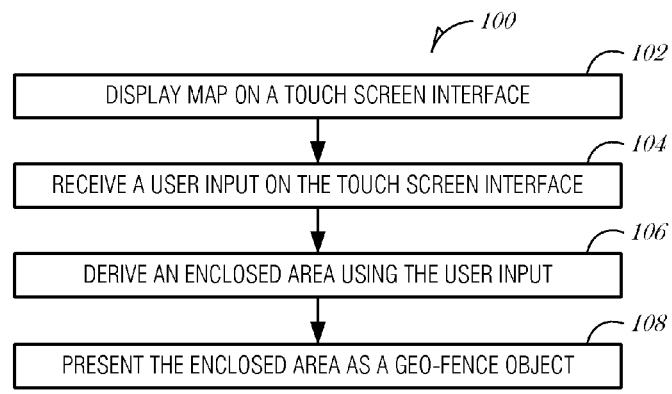
FIG. 1 is a flowchart illustrating a method of creating a geo-fence according to an embodiment.

FIG. 1 is a flowchart illustrating a method 100 of creating a geo-fence according to an embodiment. At block 102, a map is displayed on a touch screen interface of a mobile device. The map may be displayed in an interface with other controls, such as input controls to input a geo-fence's attributes or details about a geo-fence's functions. At block 104, a user input is received on the touch screen interface, the user input resulting from a user touching the touch screen interface. The user touch input may be in various forms including, but not limited to tapping, swiping, dragging, or touch-and-hold. In addition, the user touch input may be combined with one or more other types of user input including but not limited to a keyboard input, a mouse input, a voice input, and the like. At block 106, an enclosed area is derived from the user input. The enclosed area is discussed further below with reference to FIGS. 2-5. At block 108, the enclosed area is presented as a geo-fence object on the touch screen interface. For example, as illustrated in the figures discussed below, the geo-fence object may be depicted using a heavy line indicating the geo-fence boundary. Examples of various mechanism to create a geo-fence are discussed below with respect to FIGS. 2-5.

In an embodiment, the method 100 of defining the enclosed area using the user input includes determining a location of the user input on the map displayed. The method also includes identifying a first geographical structure proximate to the location of the user input and constructing a polygonal representation of the first geographical structure to define the enclosed area.

Figure 2A:
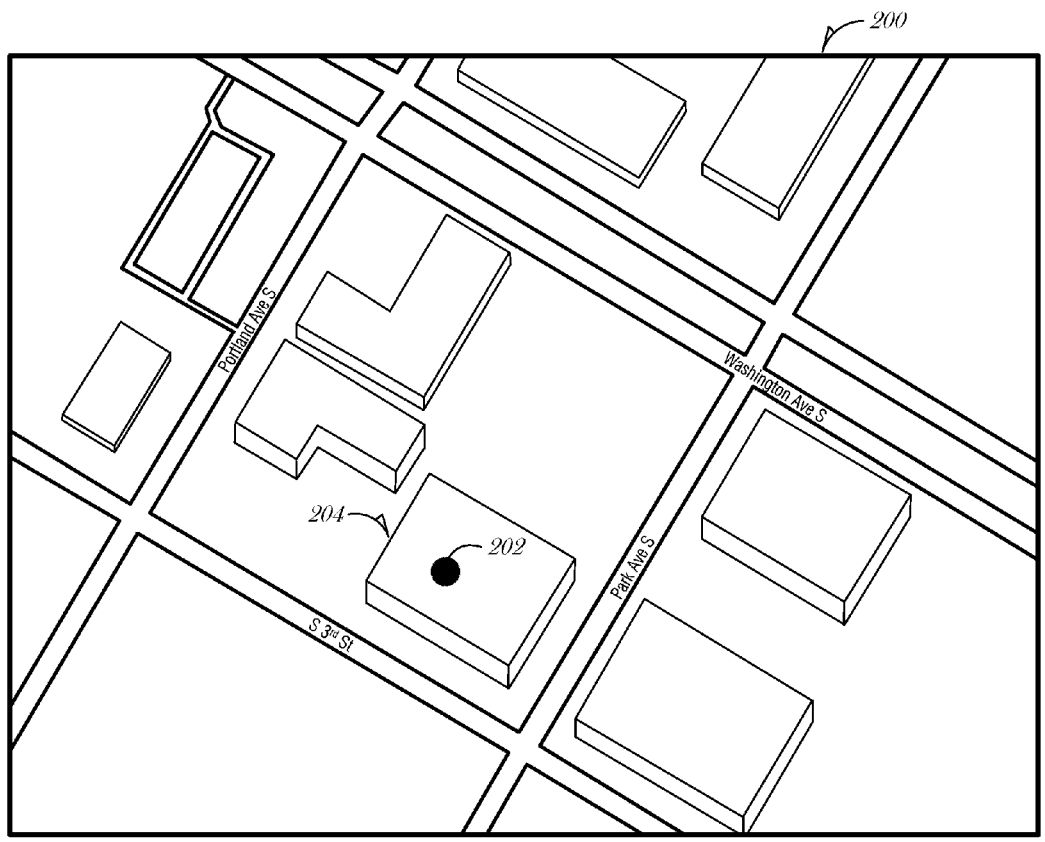
FIGS. 2A-C illustrate a map and an implementation of creating a geo-fence on the map, according to an embodiment.
Figure 2B:
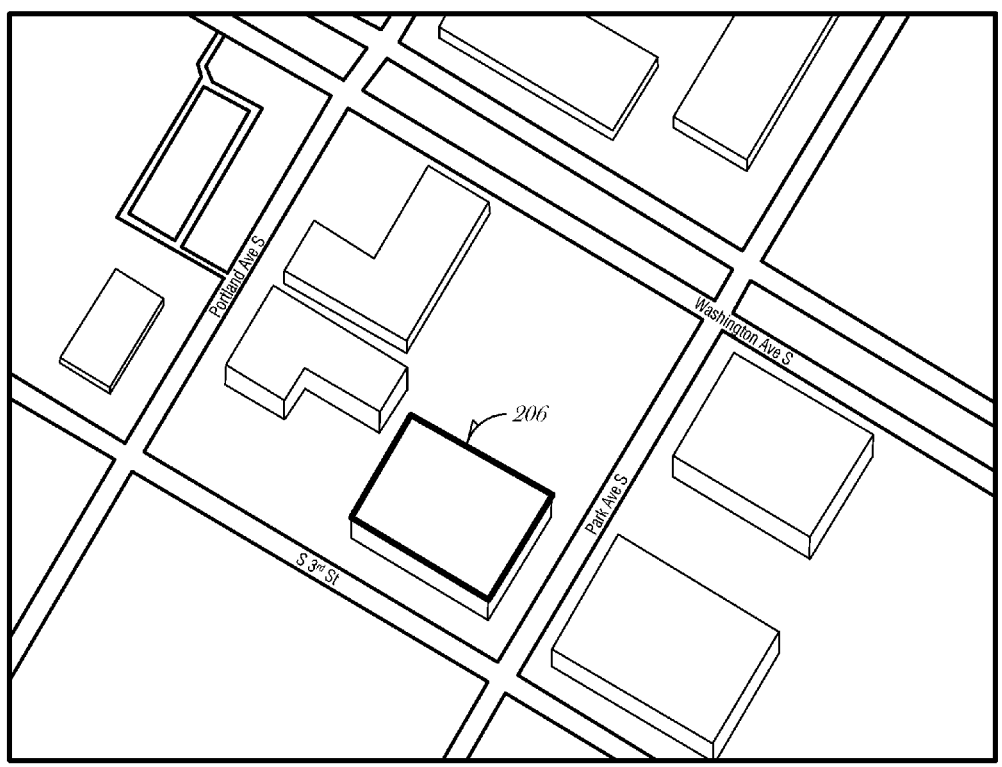
Figure 2C:
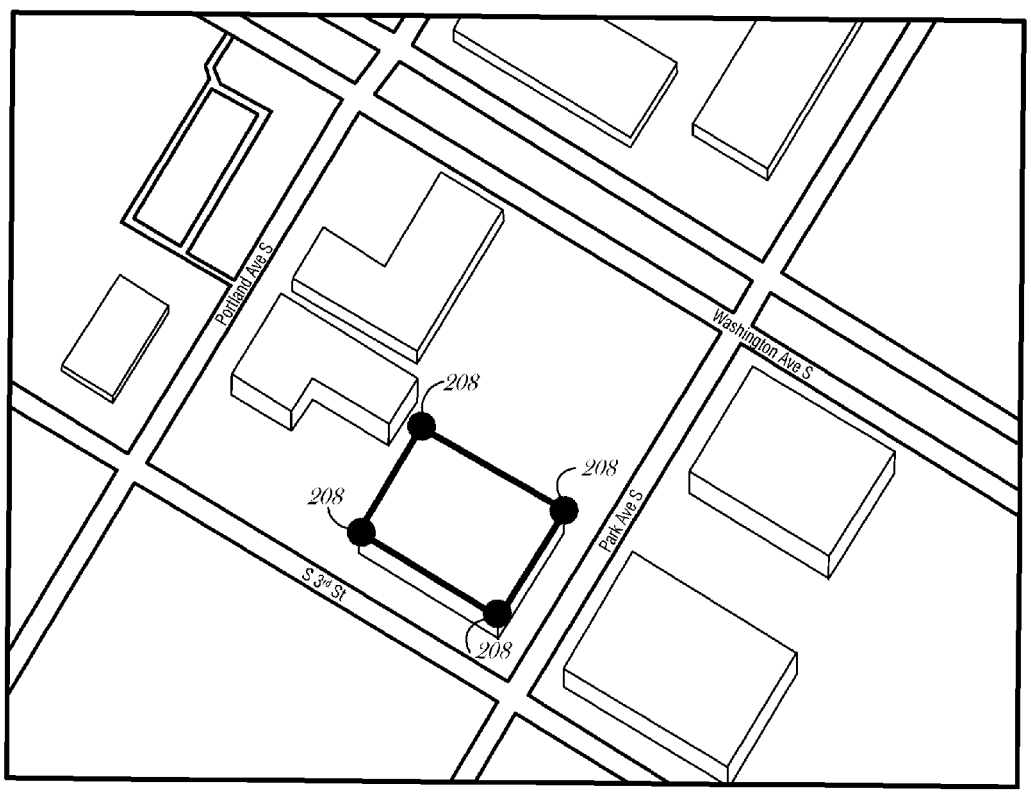

Turning to FIGS. 2A-C, in FIG. 2A, a map 200 is displayed and a user touch input point-of-contact 202 is depicted on the map 200. The point-of-contact 202 is proximate to a building 204. The building 204 is an example of a "first geographical structure." Thus, in an embodiment, the first geographical structure comprises a building. Other examples of geographical structures include but are not limited to bridges, parking lots, parks, recreational areas, monuments, and the like.

FIG. 2B depicts an example of a boundary 206 generated around the detected building. The boundary comprises a polygonal representation of the building's footprint. Constructing the polygonal representation (e.g. border) may be performed using various methods. In an embodiment, building details are obtained from a local or remote database. The building details may include a dataset of building polygons. In this situation, the nearest bounding polygon that encloses the user's touch point is returned as a geo-fence object.

In an embodiment, constructing the polygonal representation comprises using an edge detection process on map data corresponding to the map to identify edges of the first geographical structure. In an embodiment, the edge detection process may be a fast edge detection process. The map data may be filtered to identify edges surrounding the location of the user input and a corner detection process may be used to detect a plurality of vertices that define the geo-fence object. One mechanism for fast edge detection includes the use of screen scraping (e.g., capturing the contents displayed on a screen to an image). Thus, in an embodiment, using the fast edge detection process comprises screen scraping a portion of the map currently displayed on the touch screen interface to obtain a scraped image and processing the scraped image to determine edges.

After the polygonal representation is determined, in an embodiment, the vertices of the polygonal representation are illustrated to the user and may be used as input controls to move one or more vertices, thereby changing the size or shape of the polygonal representation. Such a mechanism is illustrated in FIG. 2C with vertices 208.

While FIGS. 2A-C illustrate one building being selected and a corresponding geo-fence being calculated around the building, in some embodiments, the mechanism may be extended to two or more buildings. For examples, a user may select a first building and adjust the polygonal representation of the geo-fence (e.g., border), and then select a second building in order to create a second geo-fence. The second geo-fence may be related to the first geo-fence (e.g., two areas with the shared geo-fence attributes or functions). Alternatively, the second geo-fence may be a distinct geo-fence.

Thus, in an embodiment, the method 100 comprises receiving a second user input on the touch screen interface, the second user input resulting from the user touching the touch screen interface. A second location of the second user input on the map is determined. A second geographical structure proximate to the second location of the second user input is identified and an aggregate polygonal representation including the first geographical structure and the second geographical structure is constructed to define the enclosed area.

In an embodiment, the first and second geographical structures are not adjacent to one another, and as a result, the polygonal representation comprises a plurality of polygonal areas. In an embodiment, the plurality of polygonal areas is linked as a single geo-fence object. In an alternative embodiment, the plurality of polygonal areas is distinct geo-fence objects.

One mechanism for selecting multiple geographical structures may be to tap on two or more areas of a map. The tapping may be performed using a single finger in multiple successive taps, or using multiple fingers in a substantially combined tapping input. For example, a user may select a first geographical structure using an index finger by placing the index finger on a first place on the map and then select a second geographical structure using a ring finger by placing the ring finger on a second place on the map. Another mechanism for selecting multiple structures may be to use a dragging motion to select two or more geographical structures on the path of the dragging motion. Thus, in an embodiment, the second user input comprises a dragging motion that selects the first and second geographical structures. Other mechanisms may also be used to select several geographical structures, such as using a "join" function or a "split" function. For example, a user may enter a "join" mode (e.g., by clicking a button or other user interface control), such that any geographical structures selected by touch are aggregated with a previously-selected geographical structure to form an aggregate geo-fence. A split function may be used to disconnect any joined geographical structures. Another mechanism that may be used is a keyboard input combined with a touch input (e.g., CONTROL-tap or SHIFT-tap) to select multiple geographical structures.

Figure 3:
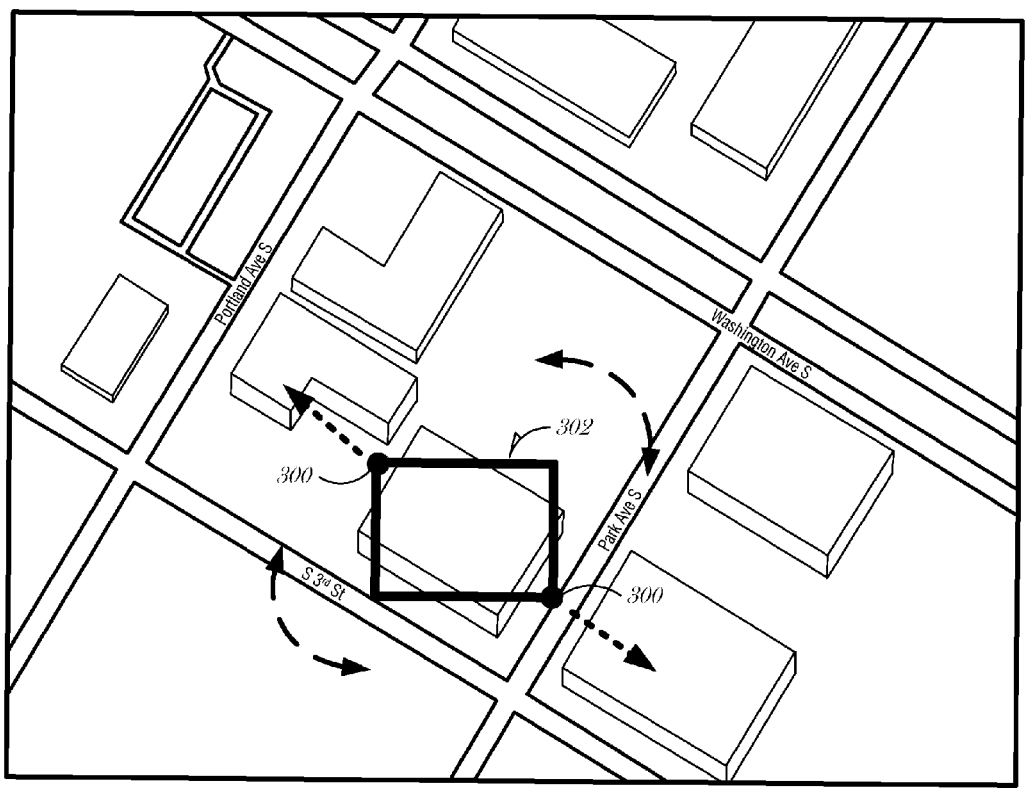
FIG. 3 illustrates a mechanism that creates a dynamic polygonal representation of a geo-fence using two or more touch inputs, according to an embodiment.

Turning now to the next figure, FIG. 3 illustrates a mechanism that creates a dynamic polygonal representation of a geo-fence using two or more touch inputs. In the example depicted in FIG. 3, a user has touched the user interface using two fingers and the shape being used is a rectangular polygon. The user's touch points create the vertices 300 of the rectangular polygon 302. After the user's manipulations, the rectangular polygon will be used to create a geo-fence of substantially similar size and shape. Based on the user's input of moving their fingers closer or farther from each other, the size of the rectangular polygon shrinks or grows accordingly. Additionally, by rotating the fingers around each other, the rectangular polygon rotates.

Thus, in an embodiment, the method 100 of defining the enclosed area using the user input comprises detecting a first and second contact point from the user input, displaying a polygonal area based on the first and second contact points, the polygonal area formed by the first and second contact points, and using the displayed polygonal area to define the enclosed area.

As illustrated in FIG. 3, in an embodiment, the polygonal area 300 comprises a rectangle and the first and second contact points are used to adjust opposing vertices of the rectangle. However, other types of polygonal areas may be used, such as a circle, triangle, or square. Thus, in an embodiment, the polygonal area comprises one of a circle, triangle, or square, and the first contact point is used to anchor the center of the circle, triangle, or square, and the second contact point is used to adjust the size of the circle, triangle, or square.

As discussed above, the user may resize the polygonal area using the vertices. Thus, in an embodiment, at least one of an expanding motion or a contracting motion of the first and second contact points relative to each other is received and the polygonal area is grown or shrunk, respectively.

Also as discussed above, the user may rotate the polygonal area. Thus, in an embodiment, a rotating input motion from the user is detected, rotating the first and second contact points. The polygonal area is then displayed moving in a corresponding rotating motion.

Another mechanism includes using a third (or fourth, fifth, sixth, etc.) touch contact point from the user and then creating a polygonal area based on the touch points. For example, the touch points may be used as the vertices (e.g., three points to create a triangle, four to create a rectangular area), and the user may size, shape, and rotate the polygonal area by moving each finger, which will move a corresponding vertex. Thus, in an embodiment, the method 100 includes detecting a third contact point from the user input and adjusting a vertex of the polygonal area based on the third contact point.

Figure 4:
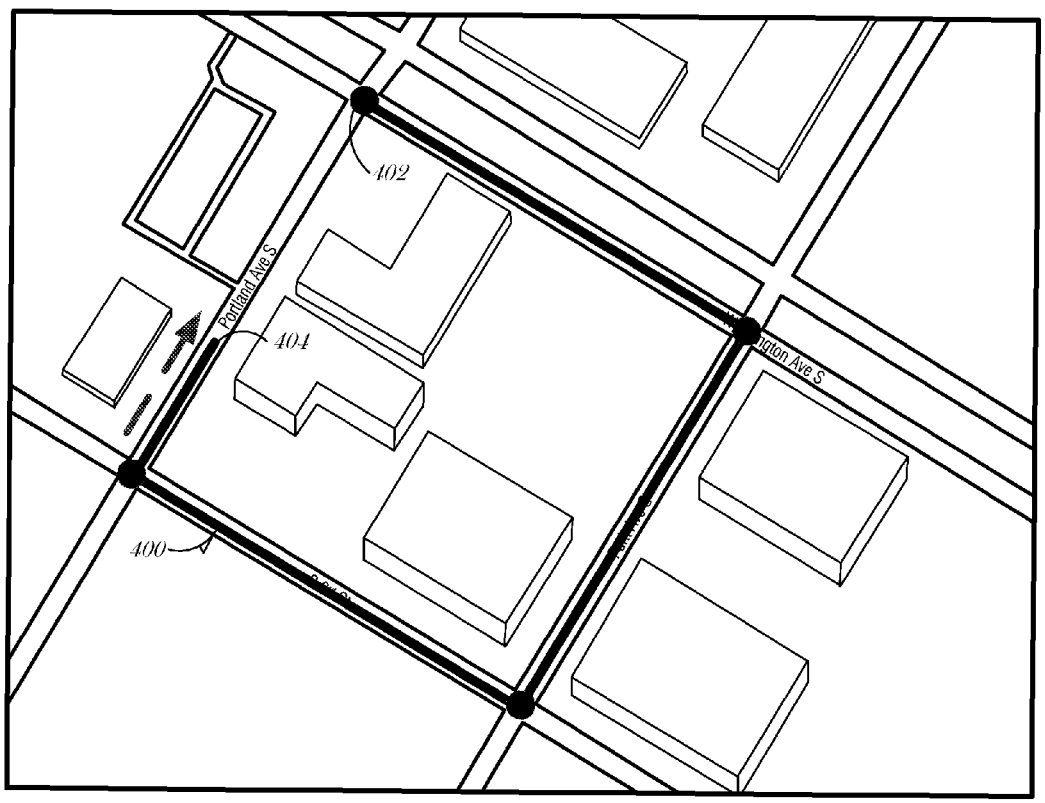
FIG. 4 illustrates a mechanism to create a geo-fence by dragging a touch input proximate to one or more roads or streets, according to an embodiment.

Turning now to the next figure, FIG. 4 illustrates a mechanism to create a geo-fence by dragging a touch input proximate to one or more roads or streets, according to an embodiment. As the user drags his fingers near streets a polygon will form, snapping to the streets (e.g., conforming), until the user closes the polygon by reaching the beginning of the drag. The area enclosed by the roads or streets is then used to construct a geo-fence. Thus, in FIG. 4, a user's dragging motion is depicted with a path 400. In the example depicted in FIG. 4, the user began the dragging motion at point 402 and dragged a finger along the path 400 to end of the path 404. Although not shown, when the user's dragging motion returns to substantially the same point as the beginning of the path (e.g., point 402), the polygonal representation is completed and the area is defined.

The vertices illustrated may be determined in various manners. For example, when a user pauses during tracing the path, a vertex may be created and displayed on the user interface at that point. Alternatively, when a user changes direction or alters course, a vertex may be created. Thus, in an embodiment, the first and second contact points are received as a portion of a dragging input mechanism from the user.

Figure 5A:
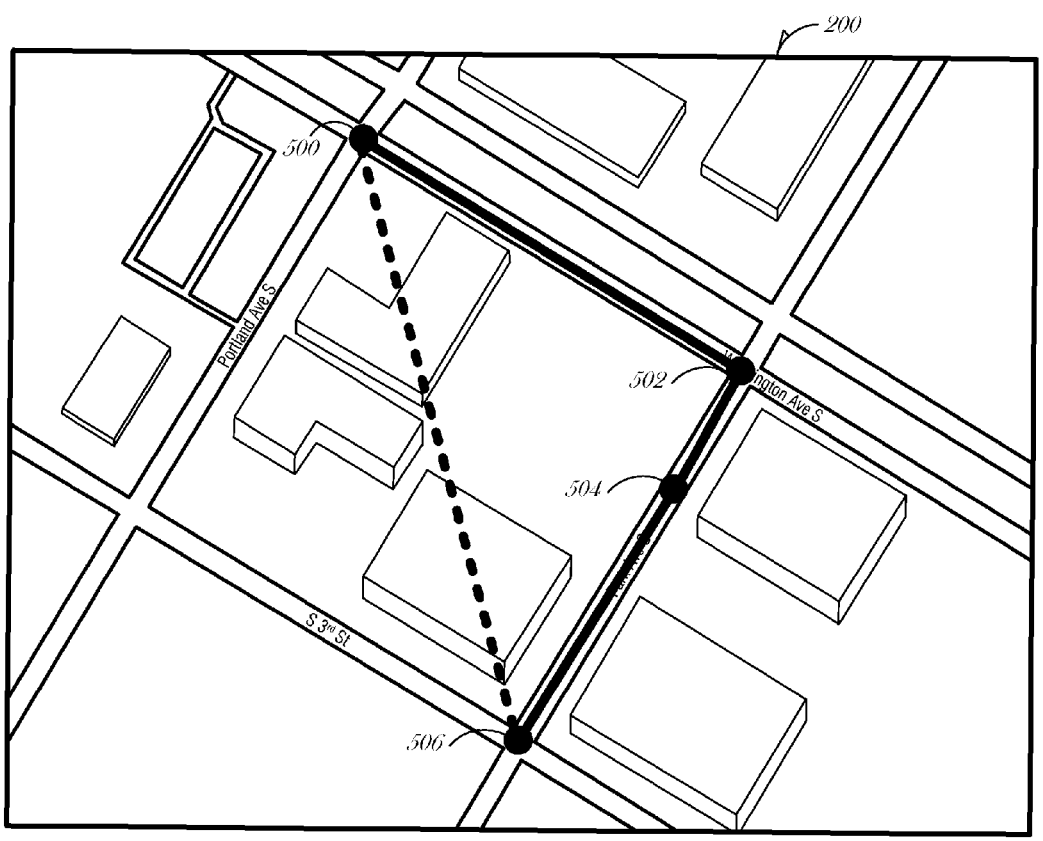
FIGS. 5A-C illustrate another mechanism to create a geo-fence proximate to one or more roads or streets, according to an embodiment.
Figure 5B:
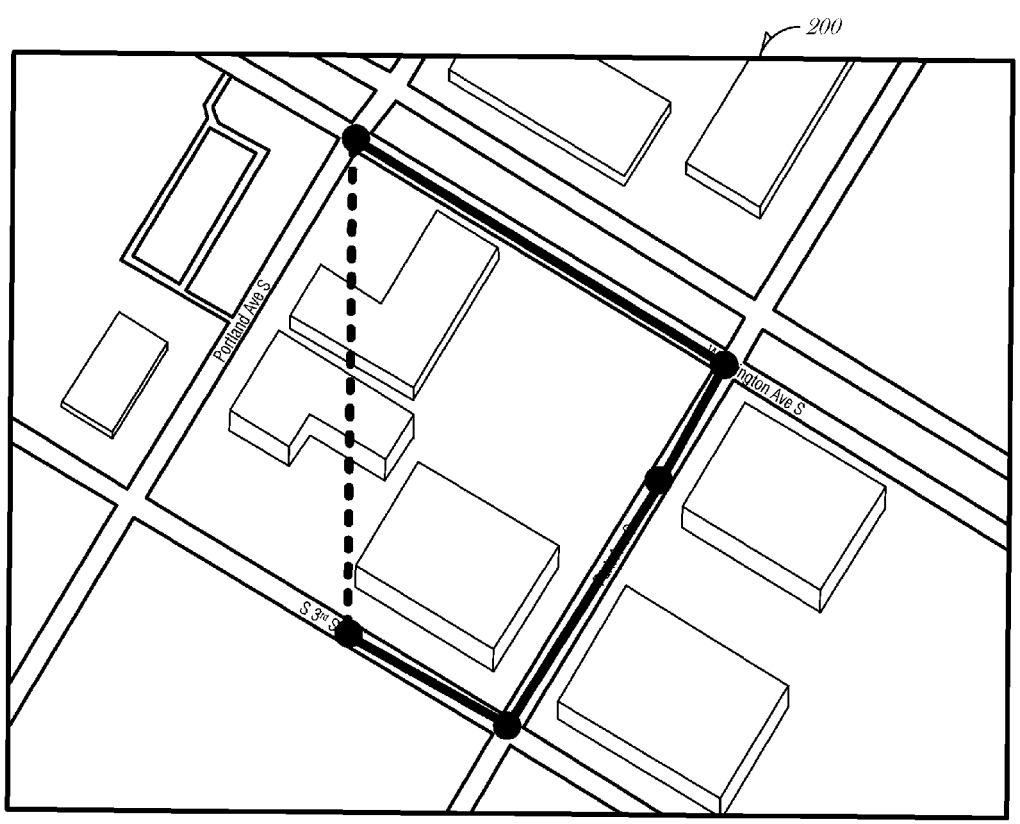
Figure 5C:
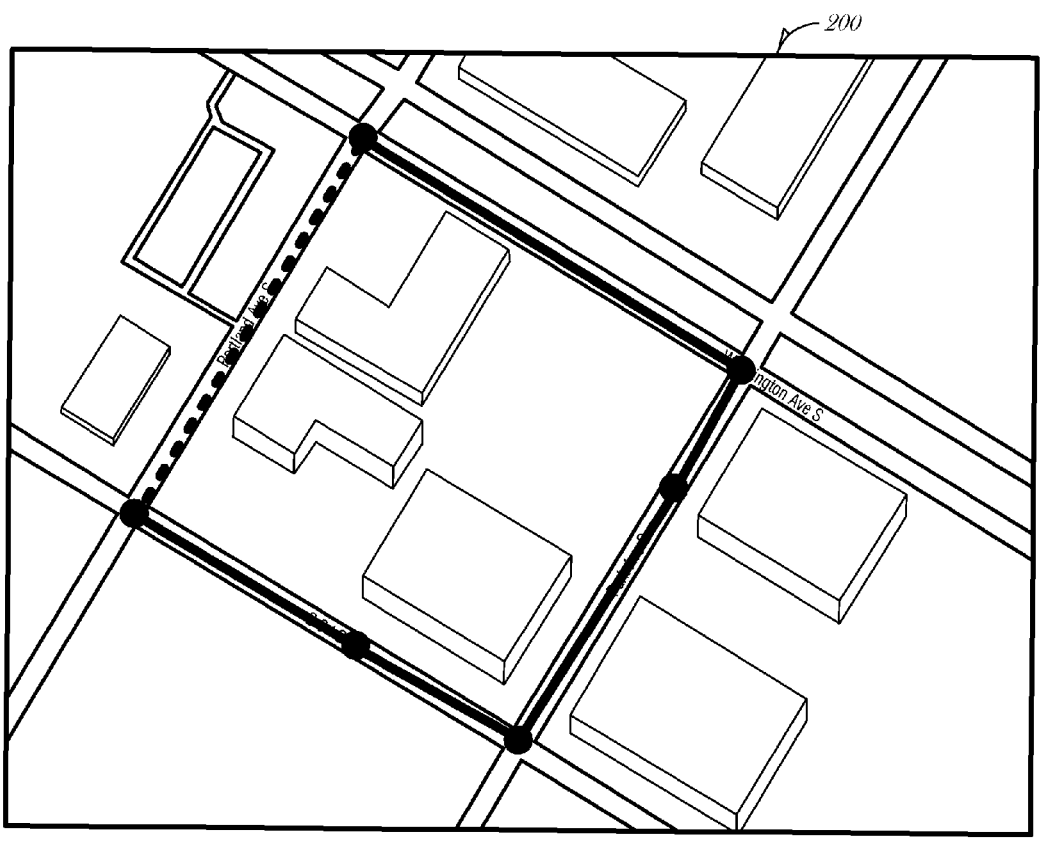

In an embodiment, the method 100 includes defining the enclosed area using the user input by detecting a first and second contact point from the user input, identifying a first road portion proximate to the first contact point, identifying a second road portion proximate to the second contact point; and forming a portion of a border of the enclosed area using the first and second road portions. Roads may be identified using various techniques, such as edge detection with screen scraping.

Where FIG. 4 illustrates one mechanism for creating a geo-fence, FIGS. 5A-C illustrate another such mechanism. Similar to the road mapping mechanism used in FIG. 4, roads are identified in the mechanism illustrated in FIGS. 5A-C. However, instead of a dragging motion to snap the vertices to the roads, the user uses several touches on or near a road to create the polygonal representation. Thus, in FIG. 5A, a user has successively touched vertex 500, vertex 502, vertex 504, and so on, until vertex 506. While the user touches the user interface, a dynamic area is formed after the user has touched three points (e.g., to create a triangular shape) and continuing until the user indicates that the shape is complete (e.g., by clicking on a "DONE" user input button control). FIGS. 5B and 5C illustrate how the polygonal area changes while the user continues to create new vertices with additional touches.

Thus, in an embodiment, a third contact point from the user input is detected. A third road portion proximate to the third contact point is detected, and the enclosed area is formed based on the first, second, and third road portions.

In any of the mechanisms illustrated or discussed with respect to FIG. 4 or 5, the enclosed area may be formed by connecting roads around a geographical structure and the geographical structure may then be associated with the geo-fence.

In some embodiments, various optimization mechanisms may be used, such as approximating curved portions of a road or reducing vertices. Curves in roads may be quantized so that the polygon does not stray too far from the shape of the road; however a "maximum number of vertices" constraint may be enforced. Thus, in an embodiment, a curved road is quantized to approximate the shape of the road. In another embodiment, the number of vertices defining the enclosed area is reduced.

While some embodiments have been discussed with respect to road snapping or street snapping, it is understood that the dragging or multiple vertex input mechanisms may be used to select areas that do not have roads. Such free form geo-fence creation may be useful to create an enclosed area where there are no roads, or where there are unconnected roads.

In an embodiment, defining a geo-fence and the associated content with that geo-fence is managed on a server in the cloud. Such features may be implemented in smartphone, notebook, or a device with Ultrabook capabilities. The features may be provided in conjunction with various operating systems, such as Android® or Windows 8®.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 6:
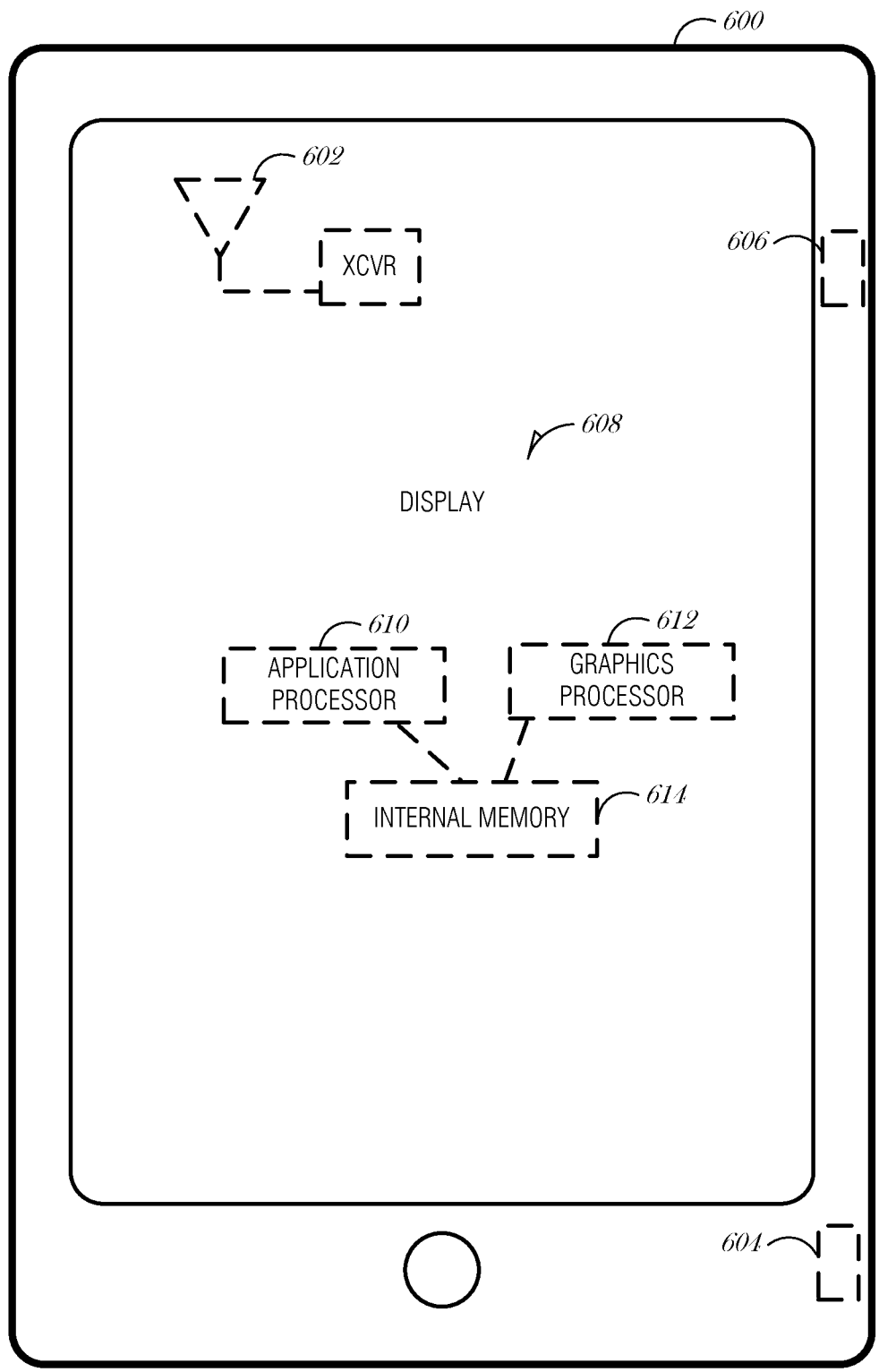
FIG. 6 is a block diagram illustrating a mobile device, according to an embodiment.

FIG. 6 is a block diagram illustrating a mobile device 600, such as a user equipment (UE), a mobile station (MS), a mobile wireless device, a mobile communication device, a tablet, a handset, or other type of mobile wireless device. The mobile device 600 may include one or more antennas 602 configured to communicate with a base station (BS), an evolved Node B (eNB), or other type of wireless wide area network (WWAN) access point. The mobile device 600 may be configured to communicate using at least one wireless communication standard including 3GPP LTE, WiMAX, High Speed Packet Access (HSPA), Bluetooth, and WiFi. The mobile device 600 may communicate using separate antennas for each wireless communication standard or shared antennas for multiple wireless communication standards. The mobile device 600 may communicate in a wireless local area network (WLAN), a wireless personal area network (WPAN), and/or a wireless wide area network (WWAN).

The mobile device may include a microphone 604 and one more speakers 606 that may be used for audio input and output from the mobile device 600. The display screen 608 may be a liquid crystal display (LCD) screen, or other type of display screen such as an organic light emitting diode (OLED) display. The display screen 608 may be configured as a touch screen. The touch screen may use capacitive, resistive, or another type of touch screen technology. An application processor 610 and a graphics processor 612 may be coupled to internal non-transitory storage device (storage memory) 614 to provide processing and display capabilities. A keyboard (not shown) may be integrated with the mobile device 600 or wirelessly connected to the mobile device 600 to provide additional user input. A virtual keyboard may also be provided using a touch screen display 608.

Figure 7:
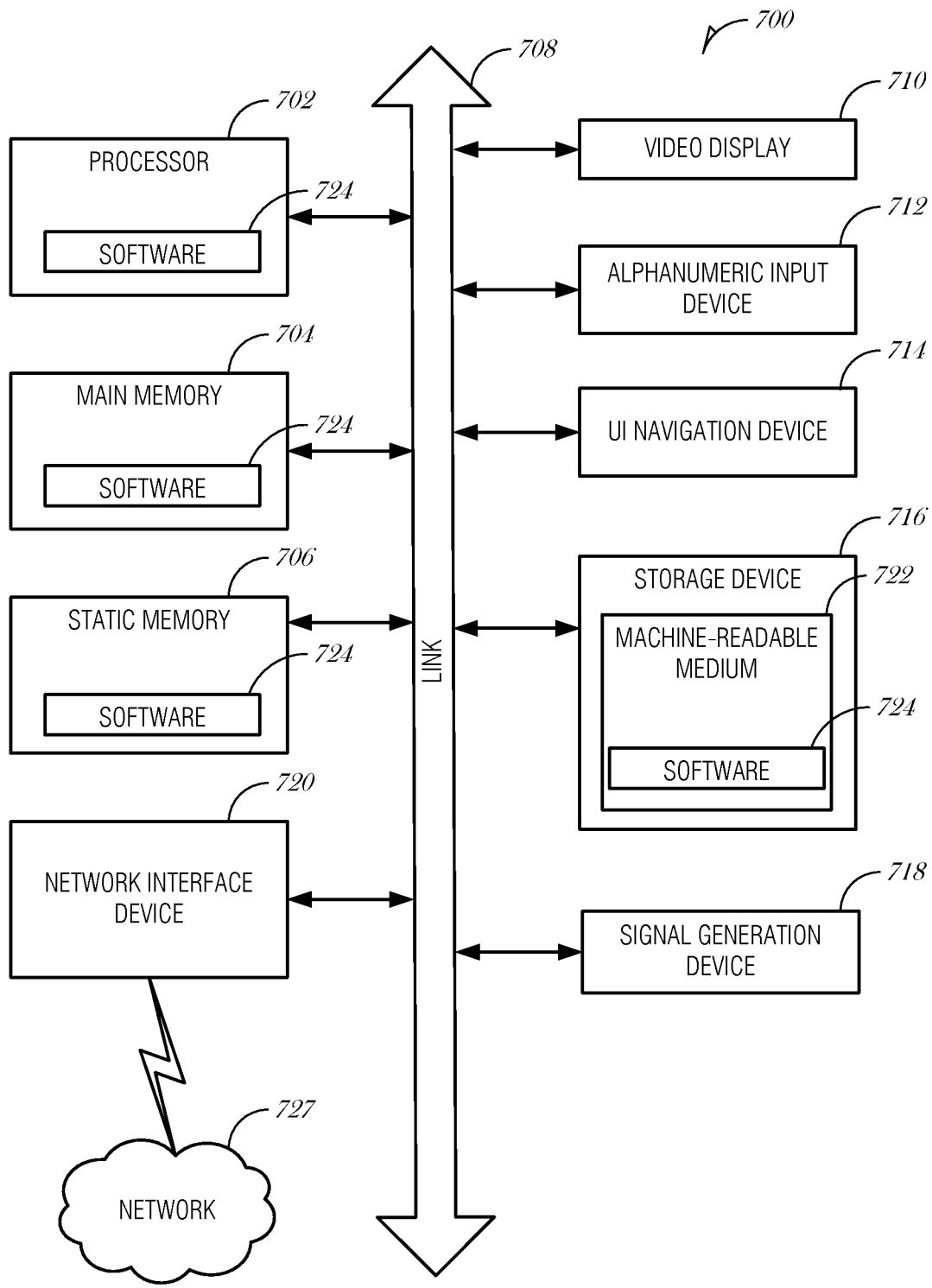
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for creating a geo-fence (such as a device, apparatus, or machine) comprising a touch screen display; an interface module adapted to: display a map on a touch screen display of a mobile device;

and receive a user input from the touch screen display, the user input resulting from a user touching the touch screen display; and a geo-fence module adapted to derive an enclosed area using the user input, wherein the interface module is adapted to present the enclosed area as a geo-fence object on the touch screen display.

In Example 2, the subject matter of Example 1 may optionally include, wherein to derive the enclosed area using the user input, the geo-fence module is adapted to: determine a location of the user input on the map; identify a first geographical structure proximate to the location of the user input; and construct a polygonal representation of the first geographical structure to define the enclosed area.

In Example 3 the subject matter of any one or more of Examples 1 to 2 may optionally include, wherein to construct the polygonal representation, the geo-fence module is adapted to: use a fast edge detection process on map data corresponding to the map to identify edges of the first geographical structure; filter the map data to identify edges surrounding the location of the user input; and use a corner detection process to detect a plurality of vertices that define the geo-fence object.

In Example 4 the subject matter of any one or more of Examples 1 to 3 may optionally include, wherein to use the fast edge detection process, the geo-fence module is adapted to: screen scrape a portion of the map currently displayed on the touch screen display to obtain a scraped image; and process the scraped image to determine edges.

In Example 5 the subject matter of any one or more of Examples 1 to 4 may optionally include, wherein the first geographical structure comprises a building.

In Example 6 the subject matter of any one or more of Examples 1 to 5 may optionally include, wherein the interface module is adapted to receive a second user input from the touch screen display, the second user input resulting from the user touching the touch screen display; and wherein the geo-fence module is adapted to: determine a second location of the second user input on the map; identify a second geographical structure proximate to the second location of the second user input; and construct an aggregate polygonal representation including the first geographical structure and the second geographical structure to define the enclosed area.

In Example 7 the subject matter of any one or more of Examples 1 to 6 may optionally include, wherein the first and second geographical structures are not adjacent to one another, and wherein the polygonal representation comprises a plurality of polygonal areas.

In Example 8 the subject matter of any one or more of Examples 1 to 7 may optionally include, wherein members of the plurality of polygonal areas are linked as a single geo-fence object.

In Example 9 the subject matter of any one or more of Examples 1 to 8 may optionally include, wherein members of the plurality of polygonal areas are distinct geo-fence objects.

In Example 10 the subject matter of any one or more of Examples 1 to 9 may optionally include, wherein the second user input comprises a dragging motion that selects the first and second geographical structures.

In Example 11 the subject matter of any one or more of Examples 1 to 10 may optionally include, wherein to derive the enclosed area using the user input, the geo-fence module is adapted to: detect, via the interface module, a first and second contact point from the user input; display, via the interface module, a polygonal area based on the first and second contact points, the polygonal area formed by the first and second contact points; and use the displayed polygonal area to define the enclosed area.

In Example 12 the subject matter of any one or more of Examples 1 to 11 may optionally include, wherein the polygonal area comprises a rectangle and wherein the first and second contact points are used to adjust opposing vertices of the rectangle.

In Example 13 the subject matter of any one or more of Examples 1 to 12 may optionally include, wherein the polygonal area comprises one of a circle, triangle, or square, and wherein the first contact point is used to anchor the center of the circle, triangle, or square, and the second contact point is used to adjust the size of the circle, triangle, or square.

In Example 14 the subject matter of any one or more of Examples 1 to 13 may optionally include, wherein the interface module is adapted to: detect a third contact point from the user input; and adjust a vertex of the polygonal area based on the third contact point.

In Example 15 the subject matter of any one or more of Examples 1 to 14 may optionally include, wherein the interface module is adapted to: detect a rotating input motion from the user, rotating the first and second contact points; and display the polygonal area moving in a corresponding rotating motion.

In Example 16 the subject matter of any one or more of Examples 1 to 15 may optionally include, wherein the interface module is adapted to: receive at least one of an expanding motion or a contracting motion of the first and second contact points relative to each other; and grow or shrink the polygonal area, respectively.

In Example 17 the subject matter of any one or more of Examples 1 to 16 may optionally include, wherein to derive the enclosed area using the user input, the geo-fence module is adapted to: detect, via the interface module, a first and second contact point from the user input; identify a first road portion proximate to the first contact point; identify a second road portion proximate to the second contact point; and form a portion of a border of the enclosed area using the first and second road portions.

In Example 18 the subject matter of any one or more of Examples 1 to 17 may optionally include, wherein the interface module is adapted to detect a third contact point from the user input; and wherein the geo-fence module is adapted to: identify a third road portion proximate to the third contact point; and form the enclosed area based on the first, second, and third road portions.

In Example 19 the subject matter of any one or more of Examples 1 to 18 may optionally include, wherein the first and second contact points are received as a portion of a dragging input mechanism from the user.

In Example 20 the subject matter of any one or more of Examples 1 to 19 may optionally include, wherein the geo-fence module is adapted to: form the enclosed area by connecting roads around a geographical structure; and associate the geographical structure with the geo-fence.

In Example 21 the subject matter of any one or more of Examples 1 to 20 may optionally include, wherein the geo-fence module is adapted to: quantize a curved road to approximate the shape of the road.

In Example 22 the subject matter of any one or more of Examples 1 to 21 may optionally include, wherein the geo-fence module is adapted to: reduce the number of vertices defining the enclosed area.

Example 23 includes or may optionally be combined with the subject matter of any one of Examples 1-22 to include subject matter for creating a geo-fence (such as a method, means for performing acts, machine readable medium including instructions that when performed by a machine cause the machine to performs acts, an apparatus configured to perform, or an apparatus with means for) comprising displaying a map on a touch screen interface of a mobile device; receiving a user input from the touch screen interface, the user input resulting from a user touching the touch screen interface; deriving an enclosed area using the user input; and presenting the enclosed area as a geo-fence object on the touch screen interface.

In Example 24, the subject matter of Example 23 may optionally include, wherein deriving the enclosed area using the user input comprises: determining a location of the user input on the map; identifying a first geographical structure proximate to the location of the user input; and constructing a polygonal representation of the first geographical structure to define the enclosed area.

In Example 25 the subject matter of any one or more of Examples 23 to 24 may optionally include, wherein constructing the polygonal representation comprises: using a fast edge detection process on map data corresponding to the map to identify edges of the first geographical structure; filtering the map data to identify edges surrounding the location of the user input; and using a corner detection process to detect a plurality of vertices that define the geo-fence object.

In Example 26 the subject matter of any one or more of Examples 23 to 25 may optionally include, wherein using the fast edge detection process comprises: screen scraping a portion of the map currently displayed on the touch screen interface to obtain a scraped image; and processing the scraped image to determine edges.

In Example 27 the subject matter of any one or more of Examples 23 to 26 may optionally include, wherein the first geographical structure comprises a building.

In Example 28 the subject matter of any one or more of Examples 23 to 27 may optionally include, receiving a second user input from the touch screen interface, the second user input resulting from the user touching the touch screen interface; determining a second location of the second user input on the map; identifying a second geographical structure proximate to the second location of the second user input; and constructing an aggregate polygonal representation including the first geographical structure and the second geographical structure to define the enclosed area.

In Example 29 the subject matter of any one or more of Examples 23 to 28 may optionally include, wherein the first and second geographical structures are not adjacent to one another, and wherein the polygonal representation comprises a plurality of polygonal areas.

In Example 30 the subject matter of any one or more of Examples 23 to 29 may optionally include, wherein members of the plurality of polygonal areas are linked as a single geo-fence object.

In Example 31 the subject matter of any one or more of Examples 23 to 30 may optionally include, wherein members of the plurality of polygonal areas are distinct geo-fence objects.

In Example 32 the subject matter of any one or more of Examples 23 to 31 may optionally include, wherein the second user input comprises a dragging motion that selects the first and second geographical structures.

In Example 33 the subject matter of any one or more of Examples 23 to 32 may optionally include, wherein deriving the enclosed area using the user input comprises: detecting a first and second contact point from the user input; displaying a polygonal area based on the first and second contact points, the polygonal area formed by the first and second contact points; and using the displayed polygonal area to define the enclosed area.

In Example 34 the subject matter of any one or more of Examples 23 to 33 may optionally include, wherein the polygonal area comprises a rectangle and wherein the first and second contact points are used to adjust opposing vertices of the rectangle.

In Example 35 the subject matter of any one or more of Examples 23 to 34 may optionally include, wherein the polygonal area comprises one of a circle, triangle, or square, and wherein the first contact point is used to anchor the center of the circle, triangle, or square, and the second contact point is used to adjust the size of the circle, triangle, or square.

In Example 36 the subject matter of any one or more of Examples 23 to 35 may optionally include, detecting a third contact point from the user input; and adjusting a vertex of the polygonal area based on the third contact point.

In Example 37 the subject matter of any one or more of Examples 23 to 36 may optionally include, detecting a rotating input motion from the user, rotating the first and second contact points; and displaying the polygonal area moving in a corresponding rotating motion.

In Example 38 the subject matter of any one or more of Examples 23 to 37 may optionally include, receiving at least one of an expanding motion or a contracting motion of the first and second contact points relative to each other; and growing or shrinking the polygonal area, respectively.

In Example 39 the subject matter of any one or more of Examples 23 to 38 may optionally include, wherein deriving the enclosed area using the user input comprises: detecting a first and second contact point from the user input; identifying a first road portion proximate to the first contact point; identifying a second road portion proximate to the second contact point; and forming a portion of a border of the enclosed area using the first and second road portions.

In Example 40 the subject matter of any one or more of Examples 23 to 39 may optionally include, detecting a third contact point from the user input; identifying a third road portion proximate to the third contact point; and forming the enclosed area based on the first, second, and third road portions.

In Example 41 the subject matter of any one or more of Examples 23 to 40 may optionally include, wherein the first and second contact points are received as a portion of a dragging input mechanism from the user.

In Example 42 the subject matter of any one or more of Examples 23 to 41 may optionally include, forming the enclosed area by connecting roads around a geographical structure; and associating the geographical structure with the geo-fence.

In Example 43 the subject matter of any one or more of Examples 23 to 42 may optionally include, quantizing a curved road to approximate the shape of the road.

In Example 44 the subject matter of any one or more of Examples 23 to 43 may optionally include, reducing the number of vertices defining the enclosed area.

Example 45 includes or may optionally be combined with the subject matter of any one of Examples 1-44 to include a computer-readable medium including instructions that when performed by a machine cause the machine to performs any one of the examples of 1-44.

Example 46 includes or may optionally be combined with the subject matter of any one of Examples 1-44 to include subject matter for creating a geo-fence comprising means for performing any one of the examples of 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for creating a geo-fence, the system comprising:
    a touch screen display;
    a hardware-based interface circuit adapted to:
        display a map on a touch screen display of a mobile device; and
        receive a user input from the touch screen display, the user input resulting from a user touching the touch screen display; and
    a hardware-based geo-fence circuit adapted to derive an enclosed area using the user input,
    wherein the interface circuit is adapted to present the enclosed area as a geo-fence object on the touch screen display; and
    wherein to derive the enclosed area using the user input, the geo-fence circuit is adapted to:
        determine a location of the user input on the map;
        identify a first geographical structure proximate to the location of the user input;
        detect a first and second contact point from the user input;
        identify a first road portion proximate to the first contact point and select the first road portion to be used as a portion of a border of the enclosed area;
        identify a second road portion proximate to the second contact point and selecting the second road portion to be used as another portion of the border of the enclosed area; and
        construct a polygonal representation including the first geographical structure and the first and second road portions to define the enclosed area; and
    wherein to construct the polygonal representation, the geo-fence circuit is adapted to:
        use an edge detection process on map data corresponding to the map to identify edges of the first geographical structure;
        filter the map data to identify edges surrounding the location of the user input; and
        use a corner detection process to detect a plurality of vertices that define the geo-fence object.

2. The system of claim 1, wherein to use the edge detection process, the geo-fence circuit is adapted to:
    screen scrape a portion of the map currently displayed on the touch screen display to obtain a scraped image; and
    process the scraped image to determine edges.

3. The system of claim 1, wherein the first geographical structure comprises a building.

4. The system of claim 1, wherein the interface circuit is adapted to receive a second user input from the touch screen display, the second user input resulting from the user touching the touch screen display; and
    wherein the geo-fence circuit is adapted to:
        determine a second location of the second user input on the map;
        identify a second geographical structure proximate to the second location of the second user input; and
        construct an aggregate polygonal representation including the first geographical structure and the second geographical structure to define the enclosed area.

5. The system of claim 4, wherein the first and second geographical structures are not adjacent to one another, and wherein the polygonal representation comprises a plurality of polygonal areas.

6. The system of claim 5, wherein members of the plurality of polygonal areas are linked as a single geo-fence object.

7. The system of claim 5, wherein members of the plurality of polygonal areas are distinct geo-fence objects.

8. The system of claim 4, wherein the second user input comprises a dragging motion that selects the first and second geographical structures.

9. The system of claim 1, wherein to derive the enclosed area using the user input, the geo-fence circuit is adapted to:

detect, via the interface circuit, a first and second contact point from the user input;

display, via the interface circuit, a polygonal area based on the first and second contact points, the polygonal area formed by the first and second contact points; and use the displayed polygonal area to define the enclosed area.

10. The system of claim 9, wherein the polygonal area comprises a rectangle and wherein the first and second contact points are used to adjust opposing vertices of the rectangle.

11. The system of claim 9, wherein the polygonal area comprises one of a circle, triangle, or square, and wherein the first contact point is used to anchor the center of the circle, triangle, or square, and the second contact point is used to adjust the size of the circle, triangle, or square.

12. The system of claim 9, wherein the interface circuit is adapted to:

detect a third contact point from the user input; and adjust a vertex of the polygonal area based on the third contact point.

13. The system of claim 9, wherein the interface circuit is adapted to:

detect a rotating input motion from the user, rotating the first and second contact points; and display the polygonal area moving in a corresponding rotating motion.

14. The system of claim 9, wherein the interface circuit is adapted to:

receive at least one of an expanding motion or a contracting motion of the first and second contact points relative to each other; and grow or shrink the polygonal area, respectively.

15. The system of claim 1, wherein the interface circuit is adapted to detect a third contact point from the user input; and wherein the geo-fence circuit is adapted to:

identify a third road portion proximate to the third contact point; and form the enclosed area based on the first, second, and third road portions.

16. The system of claim 1, wherein the first and second contact points are received as a portion of a dragging input mechanism from the user.

17. The system of claim 1, wherein the geo-fence circuit is adapted to:

form the enclosed area by connecting roads around a geographical structure; and associate the geographical structure with the geo-fence.

18. The system of claim 1, wherein to select the first road portion to be used as the portion of the border of the enclosed area, the geo-fence circuit is adapted to:

detect a user dragging touch motion near the first road portion; and snap the polygonal representation to fit the first road portion.

19. A method of creating a geo-fence, the method comprising:

displaying a map on a touch screen interface of a mobile device;

receiving a user input from the touch screen interface, the user input resulting from a user touching the touch screen interface;

deriving an enclosed area using the user input; and presenting the enclosed area as a geo-fence object on the touch screen interface;

wherein deriving the enclosed area using the user input includes:

determining a location of the user input on the map;

identifying a first geographical structure proximate to the location of the user input;

detecting a first and second contact point from the user input;

identifying a first road portion proximate to the first contact point and selecting the first road portion to be used as a portion of a border of the enclosed area;

identifying a second road portion proximate to the second contact point and selecting the second road portion to be used as another portion of the border of the enclosed area; and constructing a polygonal representation including the first geographical structure and the first and second road portions to define the enclosed area; and wherein constructing the polygonal representation includes:

using an edge detection process on map data corresponding to the map to identify edges of the first geographical structure;

filtering the map data to identify edges surrounding the location of the user input; and using a corner detection process to detect a plurality of vertices that define the geo-fence object.

20. The method of claim 19, wherein the first road portion includes a curved road, and wherein the method further comprises:

quantizing the curved road to approximate the shape of the road.

21. The method of claim 20, comprising:

reducing the number of vertices defining the enclosed area while maintaining the approximate shape of the road.

22. The method of claim 19, wherein selecting the first road portion to be used as the portion of the border of the enclosed area comprises:

detecting a user dragging touch motion near the first road portion; and snapping the polygonal representation to fit the first road portion.

* * * * *